United States Patent [19]
Lindsay

[11] Patent Number: 5,513,518
[45] Date of Patent: May 7, 1996

US005513518A

[54] MAGNETIC MODULATION OF FORCE SENSOR FOR AC DETECTION IN AN ATOMIC FORCE MICROSCOPE

[75] Inventor: Stuart M. Lindsay, Tempe, Ariz.

[73] Assignee: Molecular Imaging Corporation, Tempe, Ariz.

[21] Appl. No.: 403,238

[22] Filed: Mar. 10, 1995

Related U.S. Application Data

[63] Continuation-in-part of Ser. No. 246,035, May 19, 1994.
[51] Int. Cl.⁶ .................................................. G01B 5/28
[52] U.S. Cl. ........................................... 73/105; 250/306
[58] Field of Search .......................... 73/105; 250/306, 250/307

[56] References Cited

U.S. PATENT DOCUMENTS

| | | | |
|---|---|---|---|
| 4,806,755 | 2/1989 | Duerig et al. | 250/306 |
| 4,947,042 | 8/1990 | Nishioka et al. | 250/306 |
| 4,992,659 | 2/1991 | Abraham et al. | 250/306 |
| 4,999,494 | 3/1991 | Elings | 250/306 |
| 5,266,801 | 11/1993 | Elings et al. | 250/306 |
| 5,266,896 | 11/1993 | Rugar et al. | 324/307 |
| 5,266,897 | 11/1993 | Watanuki et al. | 324/244 |
| 5,307,693 | 5/1994 | Griffith et al. | 73/862.68 |
| 5,331,589 | 7/1994 | Gambino et al. | 365/151 |
| 5,357,105 | 10/1994 | Harp et al. | 250/234 |
| 5,388,452 | 2/1995 | Harp et al. | 73/105 |

FOREIGN PATENT DOCUMENTS

| | | | |
|---|---|---|---|
| 59004 | 3/1994 | Japan | 73/105 |

OTHER PUBLICATIONS

"Scanning tunneling microscopy and atomic force microscopy studies of bimaterials at a liquid–solid interface", Lindsay et al., J. Vac. Sci. Technol. A, vol. 11, No. 4, Jul./Aug. 1993, pp. 808–815.
"Novel Stationary–Sample Atomic Force Microscope with Beam–Tracking Lens"; P. S. Jung and D. R. Yaniv; Feb. 4, 1993; Electronic Letters, vol. 29, No. 3, pp. 264–265.
"Imaging Crystals, Polymers, and Processes in Water with the Atomic Force Microscope"; Drake, et al.; Science, vol. 243; Mar. 1989; pp. 1586–1589.
"Atomic Resolution Microscopy in Water"; Sonnenfeld, et al.; Science, Reprint Series, Apr. 11, 1986, vol. 232 pp. 211–213.
"A new symmetric scanning tunnelling microscope design"; Davidson, et al.; Journal of Vacuum Science & Technology: Part A, (1988) Mar./Apr., No. 2.
"Atomic force microscopy of liquid–covered surfaces: Atomic resolution images"; Marti, et al.; Applied Physics Letters, 51 (7), Aug. 17, 1987, American Institute of Physics, pp. 484–486.
"Scanning Tunneling Microscopy on Biological Matter", Travaglini, et al.; Surface Science (1987) (pp. 380–390).
"True Atomic Resolution by Atomic Force microscopy Through Repulsive and Attractive Forces"; Ohnesorge, et al;

(List continued on next page.)

*Primary Examiner*—Hezron E. Williams
*Assistant Examiner*—Daniel S. Larkin
*Attorney, Agent, or Firm*—D'Alessandro & Ritchie

[57] ABSTRACT

In a scanning force microscope a thin film of a magnetic material is applied to one or both surfaces of a force sensing cantilever. The cantilevers are then placed between the poles of an electromagnet and a magnetizing field applied in the direction of the soft axis of the cantilevers. The field is chosen so as to be bigger than the saturation field for the magnetic film. A small electromagnet is placed in the housing of the microscope so as to generate a field normal to the soft axis of the cantilever. The field is generated by an ac voltage and causes a time varying force to be applied to the cantilever. The corresponding modulation of the cantilever position is sensed by reflection of a laser beam into a position sensitive detector. The magnitude and phase of this signal are determined by a synchronous detector. Images of the sample surface are made at constant force gradient by scanning the cantilever over the surface while adjusting the gap between the probe and sample so as to maintain a constant output from the synchronous detector.

11 Claims, 3 Drawing Sheets

OTHER PUBLICATIONS

IBM Research Division, Science, vol. 260, Jun. 4, 1993; pp. 1451–1456.

"Simultaneous measurement of tunneling current and force as a function of position through a lipid film on solid substrate" Specht, et al.; Elsevier Science Publishers, B.V.; Surface Science Letters, Jul. 22, 1991.

"Atomic Force Microscope"; Hansma, et al. Journal of Applied Physics, 76(2), Jul. 15, 1994, American Institute of Physics, pp. 796–799.

"Viscoelasticity of living cells allows high-resolution imaging by tapping mode atomic force microscopy"; Putman, et al.; Department of Applied Physics, University of Twente, received Jan. 4, 1994 (unpublished).

MAGNETIC MODULATION OF FORCE SENSOR FOR AC DETECTION IN AN ATOMIC FORCE MICROSCOPE

STATEMENT AS TO RIGHTS TO INVENTION

The invention of the parent patent application was made with Government support under grant N00014-90-J-1455 awarded by the Office of Naval Research and Grant No. DIR-8920053 awarded by the National Science Foundation. The Government may have certain rights in this invention

CROSS-REFERENCE TO RELATED APPLICATION

This application is a continuation in part of U.S. patent application Ser. No. 08/246,035 filed May 19, 1994 in the name of Stuart M. Lindsay and assigned to the assignee of this application. The disclosure of U.S. patent application Ser. No. 08/246,035, entitled "Controlled Force Microscope for Operation in Liquids" is hereby incorporated herein by reference.

BACKGROUND OF THE INVENTION

1. Field of the Invention

Figure 1:
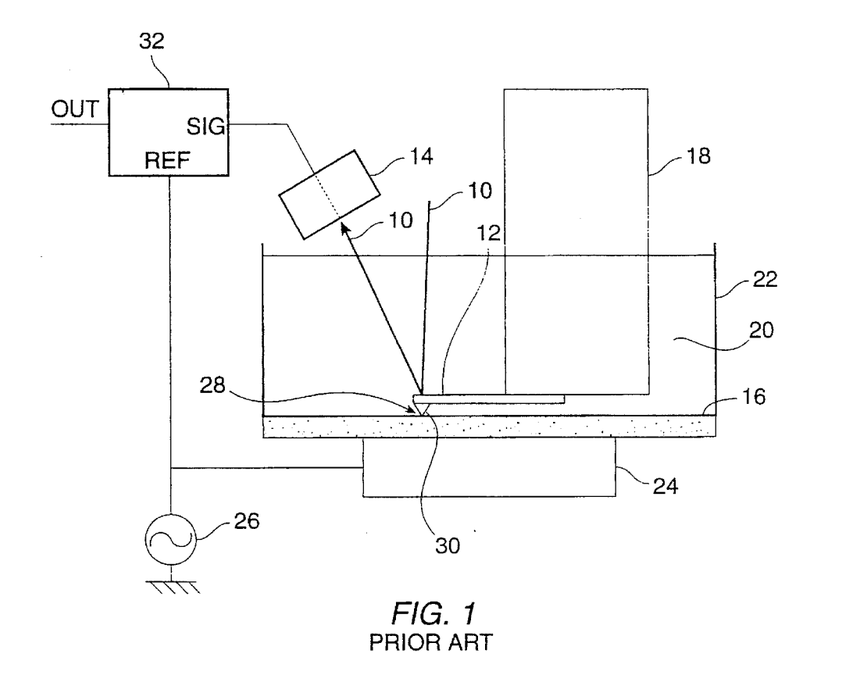
FIG. 1 is a schematic diagram of one prior art scheme for modulating the tip to substrate gap in force microscopy in fluids where the whole sample is moved up and down relative to the probe scanner.

This invention relates to the use of a magnetic field as a means of applying a time-varying force to a force-sensing cantilever in an atomic force microscope in order to enhance the imaging sensitivity of the microscope through a scheme of synchronous detection of the corresponding modulation in the cantilever deflection signal. The cantilever may be coated with a magnetic material in which is possible in fluids. In one case, this is done by modulating the position of the whole sample cell [Hansma, P. K., et al., Tapping mode atomic force microscopy in liquids, Applied Physics Letters 64, pp. 1738–1740 (1994)]. This is illustrated in FIG. 1. A laser beam 10 is reflected off a force-sensing cantilever 12 deflections of which are detected by a position sensitive detector 14. The cantilever is scanned over the sample surface 16 by a piezoelectric transducer 18. The force-sensing cantilever is immersed in a fluid body 20 contained in a fluid cell 22. The fluid cell 22 is mounted on a second transducer 24 which can displace the fluid cell 22 and sample surface 16 relative to the scanning transducer 18. An ac signal 26 is applied to the second transducer 24 so as to modulate the gap 28 between the force sensing probe tip 30 on cantilever 12 and the sample surface 16. The corresponding modulation of the laser beam position is detected by the detector 14. A synchronous detector 32 determines the amplitude and phase of the modulation. These signals are used to set the operating point of the microscope. For example, in the repulsive (contact) region of interaction between the atoms on the tip and the atoms on the sample surface, the tip deflection is in phase with the modulation and the amplitude decreased by closer contact with the surface. Thus, the height of the tip is adjusted so as to give a constant, in phase, reduction of the modulation signal as the tip is scanned over the surface. A plot of these adjustments as a function of the position of the tip in the plane of the surface constitutes a topographical height map of the surface taken at constant interaction-force-gradient.

Figure 2:
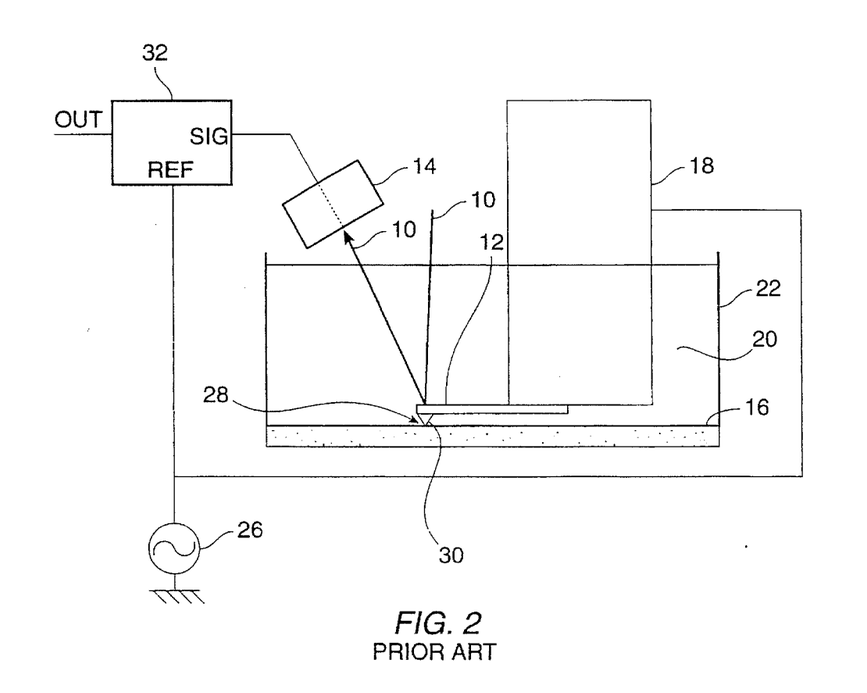
FIG. 2 is a schematic diagram of another prior art scheme where the modulating signal is applied directly to the probe scanner.

A second group [Putnam, C. A. J., et al., Viscoelasticity of living cells allows high resolution imaging by tapping mode atomic force microscopy, Applied Physics Letters, submitted (1995)] have shown that similar results may be obtained by applying the modulation signal to the scanning transducer. This is illustrated in FIG. 2. The components are the same as those shown in FIG. 1, with the exception of the second transducer 24 which is omitted in this case. The gap 28 case the force may be applied either as a result of the torque induced by a magnetic field on a permanently magnetized cantilever or as the result of the force on a permanent or induced magnetic moment that arises from gradients in the applied field.

2. The Prior Art

The atomic force microscope works by scanning a force-sensing probe over a surface and in close proximity to it. Small deflections of the probe are sensed and used to maintain a constant interaction force (i.e., constant height of the probe above the surface). By recording the adjustments needed to maintain the interactions constant, a topographical map of surface features may be made [Binnig, G., et al., Atomic Force Microscope, Physical Review Letters 56(9), pp. 930–933 (1986)].

An improvement results if the position of the force-sensing probe is modulated (at a frequency, f) and the corresponding ac signal detected. This is because (a) this can result in reduced bandwidth (and hence reduced noise) if synchronous (i.e., lock-in) detection is used and (b) the amplitude of the ac signal is a measure of the derivative of the interaction force versus distance. This quantity changes much more rapidly than the interaction force itself. It is positive in the region where interaction forces are attractive (usually at large distances) and negative where interaction forces are repulsive (at short distances, i.e., in contact). Such a scheme has been described for non-contact AFM operation in air by Martin et al. [Martin, Y., et al., Atomic force microscope-force mapping and profiling on a sub 100 angstrom scale, Journal of Applied Physics 61 (10), pp. 4723–4729 (1987)].

It has generally been believed that such operation in fluid would not be possible because of hydrodynamic damping of the cantilever. However, two groups have recently demonstrated that sensitive ac detection of the force gradient is modulated directly by a signal 26 applied to the scanning transducer 18.

Both of these approaches suffer from several drawbacks. The frequency of modulation is limited by the low-resonant frequency of the parts that are being displaced. In one case (FIG. 1) this is the whole sample cell. In the other case (FIG. 2) it is the whole scanning assembly. Furthermore, these complex assemblies have many resonances, not all of which cause the tip to be displaced with respect to the surface. Furthermore, these schemes make use of piezoelectric transducers which require high voltages for their operation, a requirement that imposes constraints when the microscope is operated in conducting liquids.

An alternative method of modulating the gap has been proposed by Lindsay in U.S. patent application Ser. No. 08/246,035 (incorporated herein by reference) and others [O'Shea, S. J., et al., Atomic force microscopy of local compliance at solid-liquid interfaces, Chemical Physics Letters, submitted (1995)]. In this approach, a magnetic particle or coating is applied to the force sensing cantilever and an external magnetic field is used to apply a force to the cantilever. This approach works in different ways, depending upon the direction of magnetization of the particle or film. O'Shea, et al. do not describe a method for controlling the direction of the magnetization of the film on the cantilever. Neither do they describe a method for producing force-gradient images by using this technique to modulate the gap between the tip and sample. Lindsay has described a reproducible method for applying a force to a cantilever using an external magnetic field and also a method for forming images by modulating the position of the cantilever with this technique. However, the magnetic arrangement described by Lindsay requires either a large magnetic moment on the tip or a large field gradient.

Figure 3:
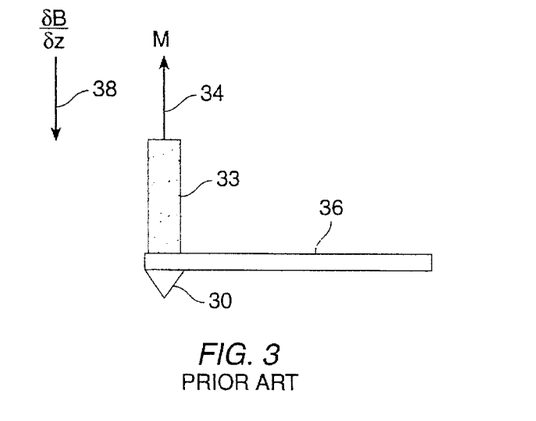
FIG. 3 is a diagram of a prior art scheme for placing a magnetic force on a force-sensing cantilever.
Figure 4:
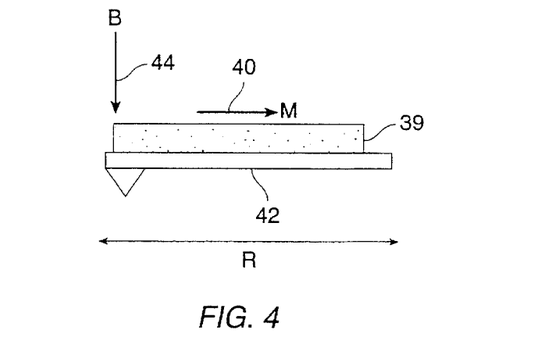
FIG. 4 is a diagram illustrating the arrangement used in the present invention: a field normal to the magnetic moment of the cantilever exerts a torque on the cantilever.

Two approaches to applying a magnetic force are illustrated in FIGS. 3 and 4. FIG. 3 shows the arrangement described in Lindsay. A magnetic particle or film 33 is magnetized so that the resulting moment, M (34) lies perpendicular to the soft axis of the cantilever 36. Then a magnetic field gradient 38 is applied in the same direction as M (34). The result is a force that is normal to the soft axis of the cantilever. A second arrangement is shown in FIG. 4. Here, a film, or particle 39 attached to the cantilever is magnetized with a moment M(40) along the soft axis of the cantilever 42. A magnetic field B (44) is applied normal to the soft axis of the cantilever. This results in a torque N=M×B. Thus, with a cantilever of length R, a force F of magnitude F=|N|/ R is applied to the end of the tip perpendicular to the soft axis of the cantilever. This latter method is to be preferred. This is because it is generally easier to obtain a high value of magnetic field than a high value of magnetic field gradient.

OBJECTS AND ADVANTAGES OF THE INVENTION

Accordingly, it is an object of the present invention to provide a microscope in which ac modulation of the gap is obtained by movement of only the force sensing cantilever, so that the modulation may be applied at a high frequency, avoiding spurious resonances.

Another object of the present invention is to use a method of modulation that is consistent with operation in fluids.

Yet another object of the present invention is to produce force-sensing cantilevers that are consistently magnetized with a moment along the soft axis of the cantilever.

These and many other objects and advantages of the present invention will become apparent to those of ordinary skill in the art from a consideration of the drawings and ensuing description of the invention.

SUMMARY OF THE INVENTION

The forgoing objects have been achieved in the scanning force microscope of the present invention. A thin film of a magnetic material is applied to one or both surfaces of a force sensing cantilever. The cantilevers are then placed between the poles of an electromagnet and a magnetizing field applied in the direction of the soft axis of the cantilevers. The field is chosen so as to be bigger than the saturation field for the magnetic film. A small electromagnet is placed in the housing of the microscope so as to generate a field normal to the soft axis of the cantilever. The field is generated by an ac voltage and causes a time varying force to be applied to the cantilever. The corresponding modulation of the cantilever position is sensed by reflection of a laser beam into a position sensitive detector. The magnitude and phase of this signal are determined by a synchronous detector. Images of the sample surface are made at constant force gradient by scanning the cantilever over the surface while adjusting the gap between the probe and sample so as to maintain a constant output from the synchronous detector.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 5:
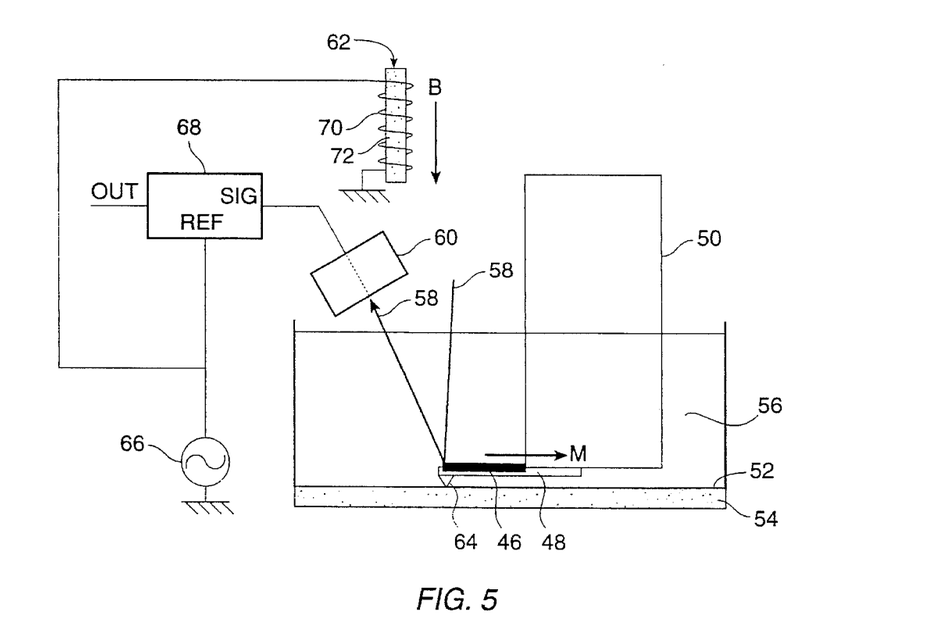
FIG. 5 is a schematic diagram illustrating the overall layout of an ac magnetically modulated force sensing microscope constructed according to a presently preferred embodiment of the present invention.

An overall layout of the scanning force microscope according to a presently preferred embodiment of the present invention is shown in FIG. 5. A thin film or particles of magnetic material 46 is applied to the back of a force-sensing cantilever 48 with the direction of the magnetic moment M along the soft axis of the cantilever 48. The cantilever 48 is attached to a scanning transducer 50 which holds it above the surface 52 of a sample 54 which may be submerged in a fluid body 56. A laser beam 58 is reflected from the back of the cantilever 48 into a position-sensitive detector 60 so that deflections of the cantilever 48 may be detected and recorded. A small solenoid 62 is placed near cantilever 48 so as to generate a magnetic field B that is predominantly perpendicular to the soft axis of cantilever 48. For the purpose of modulating the position of the tip 64 of cantilever 48 with respect to the sample surface 52, an alternating current (ac) voltage source 66 is used to drive the solenoid 62. The corresponding modulation level is detected by a synchronous detector 68 which is also driven with the ac signal 66 as a reference.

The ac signal is preferably a sine wave. It is higher in frequency than the highest frequency associated with scanning a pixel, but generally equal to (or less than) the resonant frequency of the force sensing cantilever (which is typically about 50 kHz).

The synchronous detector averages that part of the input signal bearing a constant phase to the reference signal. If the input signal is S(t) and the reference signal (the signal that did the modulation) is A cos(ωt), then the synchronous detector forms the averaged product:

$$\frac{1}{\tau} \int_0^\pi S(t) A \cos(\omega t + \phi) dt$$

where φ is a fixed phase shift (which can be set electronically to cancel systematic unwanted phase shifts or to detect the quadrature component of the signal) and τ is a time constant for integration of the signal. This time constant is set equal to about the time taken to scan one pixel in the final image. In this way, the averaging does not loose resolution. The modulation period $(2\pi/\omega)$ must be less than the integration time in order for averaging to occur.

In operation, the microscope height (z height) is controlled by a feedback control loop as is well known to those of ordinary skill in the art. The output of the feedback control loop acts to adjust the output of the synchronous detector so that it remains constant while the z height is adjusted to achieve this. The topographical output of the microscope is the map of adjustments to the z height.

Construction of a suitable solenoid and choices of magnetic materials are described in co-pending U.S. patent application Ser. No. 08/246,035 which is incorporated by reference. According to a presently preferred embodiment of the present invention, the solenoid is made from several hundred turns of pile-wound wire 70 on a Permendur core 72 (available from Eagle Alloys of Jefferson City, Tenn.). This produces a field of about 100 Gauss at a distance of about 3 mm from the pole piece when a current of 500 mA is passed through the coil. Other mechanisms and variants for delivering this magnetic field could also be used as would be known to those of ordinary skill in the art.

Figure 6:
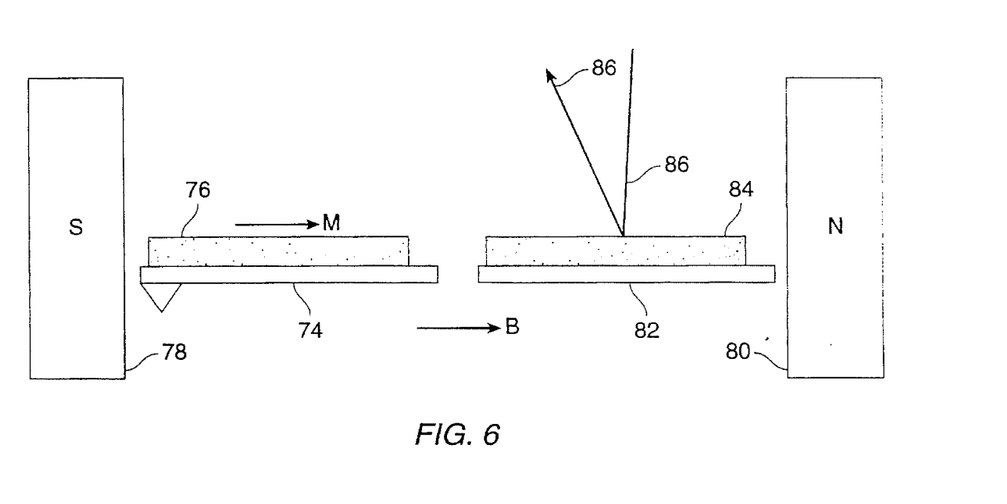
FIG. 6 is a schematic diagram illustrating the scheme used in the present invention for magnetizing the cantilevers and for calibrating the magnetization.
Figure 7:
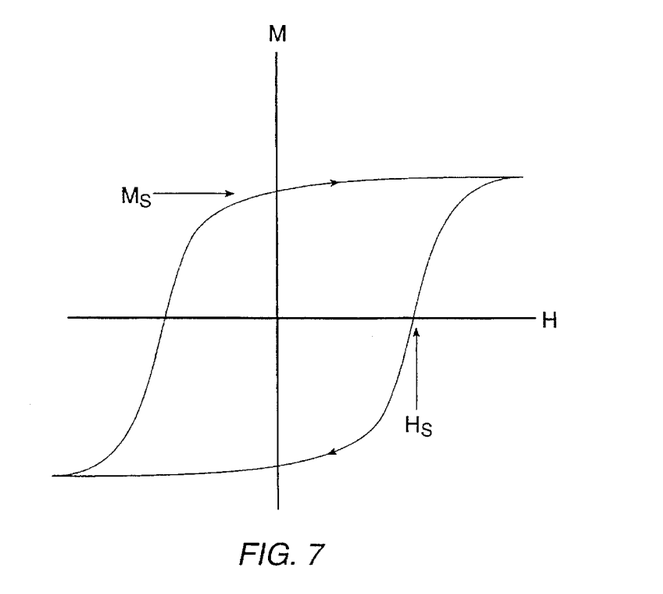
FIG. 7 is a graphical plot illustrating a typical hysteresis loop for a magnetic thin film.

An important step in the preparation of the cantilevers 48 is the formation of a controlled magnetic moment. One method for doing this is to place the cantilever in a strong magnetizing field. According to a presently preferred embodiment of the present invention, a film of Cobalt of about 500 angstroms thickness is evaporated onto the cantilever surface. Films of this thickness and composition are relatively easy to magnetize in the plane of the film. The magnetization can be monitored by simultaneous preparation of a film on a test substrate such as a wafer of silicon. This process is illustrated in FIG. 6. The cantilever 74 is coated with a magnetic film 76 and is placed between the pole pieces of an electromagnet 78, 80 with its soft axis lying along the field direction. Magnetization of the thin film 76 can be monitored using a separate test specimen, consisting of a silicon wafer 82 coated with an identical thin magnetic film 84. A laser beam 86 from an ellipsometer (not shown) is used to measure the local magnetization using rotation of the polarization of the incident light 86. The magnetic field is swept as the magnetization of the film is recorded. A typical magnetization curve for such a thin film is shown in FIG. 7. It shows the characteristic hysteresis loop due to the permanent magnetization of the sample at a saturation magnetization $M_s$ which occurs at a saturating field $H_s$.

A typical value for $M_s$ is 1,400 emu/cm$^3$ and a typical value for $H_s$ is 400 Gauss. A force sensing cantilever has typical dimensions of 100 μm by 100 μm. Covered with a 500 Å thickness of cobalt film, this gives a volume of $5\times10^{-10}$ cm$^3$ of magnetic material. When magnetized to saturation, this yields a moment of $7\times10^{-10}$ emu. In a field of 100 Gauss normal to the magnetic moment, this results in a torque of $7\times10^{-5}$ dyne-cm. Thus, at the end of a 100 μm cantilever, the force is $7\times10^{-3}$ dyne or $7\times10^{-8}$ N. Thus, for a force-sensing cantilever with a spring constant of 0.1N/m, a reasonable magnetic field can move the tip by up to 100 nm.

Thus, the degree of control is adequate not only for applying modulation to the cantilever (where displacements of 0.01 nm are adequate) but also for controlling instabilities in the cantilever position caused by attractive forces which pull the cantilever into the surface. This is described more fully in U.S. patent application Ser. No. 08/246,035.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A scanning probe microscope for generating a signal corresponding to the surface characteristics of a scanned sample, comprising:

a force sensing probe tip disposed on a first side of a free end of a flexible cantilever and adapted to be brought into close proximity to a sample surface;

a film including a magnetized material disposed on a second side opposite said first side of said flexible cantilever;

an XY scanner for generating relative scanning movement between said force sensing probe tip and said sample surface;

a Z control for adjusting the distance between said force sensing probe tip and said sample surface;

a deflection detector for generating a deflection signal indicative of deflection of said flexible cantilever;

an ac signal source;

a magnetic field generator for generating a magnetic field directed toward said second side of said flexible cantilever, said magnetic field generator coupled to said ac signal source so as to modulate said magnetic field with said ac signal; and a synchronous detector having said ac signal as a reference input and said deflection signal as a signal input, an output of said synchronous detector corresponding to the surface characteristics of the scanned sample.

2. A scanning probe microscope according to claim 1 wherein said magnetic field generator includes a solenoid.

3. A scanning probe microscope according to claim 1 wherein said flexible cantilever, said force sensing probe tip and said sample surface are all submerged in a fluid.

4. A scanning probe microscope according to claim 3 wherein said fluid is a liquid.

5. A scanning probe microscope according to claim 4 wherein said fluid is water.

6. A scanning probe microscope according to claim 1 wherein said magnetized material has a magnetic moment parallel to the soft axis of said flexible cantilever.

7. A microscope according to claim 1 wherein said magnetic material has a magnetic moment parallel to the soft axis of said flexible cantilever.

8. A microscope for determining the characteristics of the surface of a sample, said microscope comprising:

a force sensing probe tip disposed on a first side of a free end of a flexible cantilever;

a magnetic material disposed on a second side of said free end of a flexible cantilever, said second being opposite said first side;

means for detecting bending of said cantilever and producing a deflection signal in response thereto;

means for scanning said force sensing probe tip relative to the surface of the sample; and an ac signal source;

magnetic field generating means for generating a magnetic field directed toward said second side of said free end of said cantilever, said magnetic field generating means responsive to said ac signal source for causing ac modulation of said magnetic field; and a synchronous detector responsive to said deflection signal and said ac signal for generating an output signal corresponding to surface characteristics of the scanned sample.

9. A microscope according to claim 8 wherein said force sensing probe tip and the surface of the sample are all submerged in a fluid.

10. A microscope according to claim 9 wherein said fluid is a liquid.

11. A microscope according to claim 10 wherein said fluid is water.

* * * * *

UNITED STATES PATENT AND TRADEMARK OFFICE
CERTIFICATE OF CORRECTION

| | | |
|---|---|---|
| PATENT NO. : | 5,513,518 | Page 1 of 2 |
| DATED : | May 7, 1996 | |
| INVENTOR(S) : | Stuart M. Lindsay | |

It is certified that error appears in the above-indentified patent and that said Letters Patent is hereby corrected as shown below:

Column 1, lines 27 through 62, delete all text following the word "which" in line 32 and all text in lines 28 through 67.

Column 2, lines 1 through 3, delete all text in lines 1 and 2, and delete the numerals "28" before the word "case".

Column 2, line 38, before the word "modulated" insert --possible in fluids. In one case, this is done by modulating the position of the whole sample cell [Hansma, P. K., et al., *Tapping mode atomic force microscopy in liquids*, Applied Physics Letters 64, pp. 1738-1740 (1994)]. This is illustrated in FIG. 1. A laser beam 10 is reflected off a force-sensing cantilever 12 deflections of which are detected by a position sensitive detector 14. The cantilever is scanned over the sample surface 16 by a body 20 contained in a fluid cell 22. The fluid cell 22 is mounted on a second transducer 24 which can displace the fluid cell 22 and sample surface 16 relative to the scanning transducer 18. An ac signal 26 is applied to the second transducer 24 so as to modulate the gap 28 between the force sensing probe tip 30 on cantilever 12 and the sample surface 16. The corresponding modulation of the laser beam position is detected by the detector 14. A synchronous detector 32 determines the amplitude and phase of the modulation. These signals are used to set the operating point of the microscope. For example, in the repulsive (contact) region of

UNITED STATES PATENT AND TRADEMARK OFFICE
CERTIFICATE OF CORRECTION

PATENT NO. : 5,513,518
DATED : May 7, 1996
INVENTOR(S) : Stuart M. Lindsay

It is certified that error appears in the above-indentified patent and that said Letters Patent is hereby corrected as shown below:

interaction between the atoms on the tip and the atoms on the sample surface, the tip deflection is in phase with the modulation and the amplitude decreased by closer contact with the surface. Thus, the height of the tip is adjusted so as to give a constant, in phase, reduction of the modulation signal as the tip is scanned over the surface. A plot of these adjustments as a function of the position of the tip in the plane of the surface constitutes a topographical height map of the surface taken at constant interaction-force-gradient.

A second group [Putnam, C.A.J., et al., *Viscoelasticity of living cells allows high resolution imaging by tapping mode atomic force microscopy*, Applied Physics Letters, submitted (1995)] have shown that similar results may be obtained by applying the modulation signal to the scanning transducer. This is illustrated in FIG. 2. The components are the same as those shown in FIG. 1, with the exception of the second transducer 24 which is omitted in this case. The gap 28 is--.

Signed and Sealed this

Thirty-first Day of December, 1996

*Attest:*

BRUCE LEHMAN

*Attesting Officer*  *Commissioner of Patents and Trademarks*